United States Patent [19]

Cane

[11] Patent Number: 4,525,778
[45] Date of Patent: Jun. 25, 1985

[54] COMPUTER MEMORY CONTROL

[75] Inventor: David A. Cane, Sudbury, Mass.

[73] Assignee: Massachusetts Computer Corporation, Westford, Mass.

[21] Appl. No.: 381,860

[22] Filed: May 25, 1982

[51] Int. Cl.³ ............................................. G06F 13/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,909,798 | 9/1975 | Wallach et al. | 364/200 |
| 4,068,303 | 1/1978 | Morita | 364/200 |
| 4,084,225 | 4/1978 | Anderson et al. | 364/200 |
| 4,333,144 | 6/1982 | Whiteside et al. | 364/200 |
| 4,403,285 | 9/1983 | Kikuchi | 364/200 |
| 4,410,941 | 10/1983 | Barrow et al. | 364/200 |

Primary Examiner—Raulfe B. Zache
Attorney, Agent, or Firm—Wolf, Greenfield & Sacks

[57] ABSTRACT

A computer memory control capable of controlling a virtual memory system and optimized for handling multi-tasking or multi-processing systems is disclosed. In operation, each task or process is assigned a unique process number. The memory control circuitry which translates a virtual address produced by the system processor into a physical address suitable for memory access includes a unique translation buffer store each entry of which comprises a physical address, the usual tag bits and the process number of the process utilizing that address. During an address translation, buffer store entries are indexed using the virtual address used by the processor. In addition to the usual tag bit comparison to verify data validity, a comparison is made between the process number of the process presently running and the process number stored at the indexed buffer entry. The translation is considered successful only if both the tag bits and the process numbers match. With this arrangement each process is effectively assigned a unique address space in the translation buffer and translations reside in the buffer simultaneously for all running processes.

In order to prevent continual overwriting of the translation buffer entries when a plurality of short programs are running simultaneously, an offset number, uniquely associated with each process, is added to a portion of the virtual address prior to indexing the translation buffer store in order to physically separate the address space for each process from other address spaces which are simultaneously in the buffer.

11 Claims, 6 Drawing Figures

SHEET 1

SHEET 2

SHEET 1

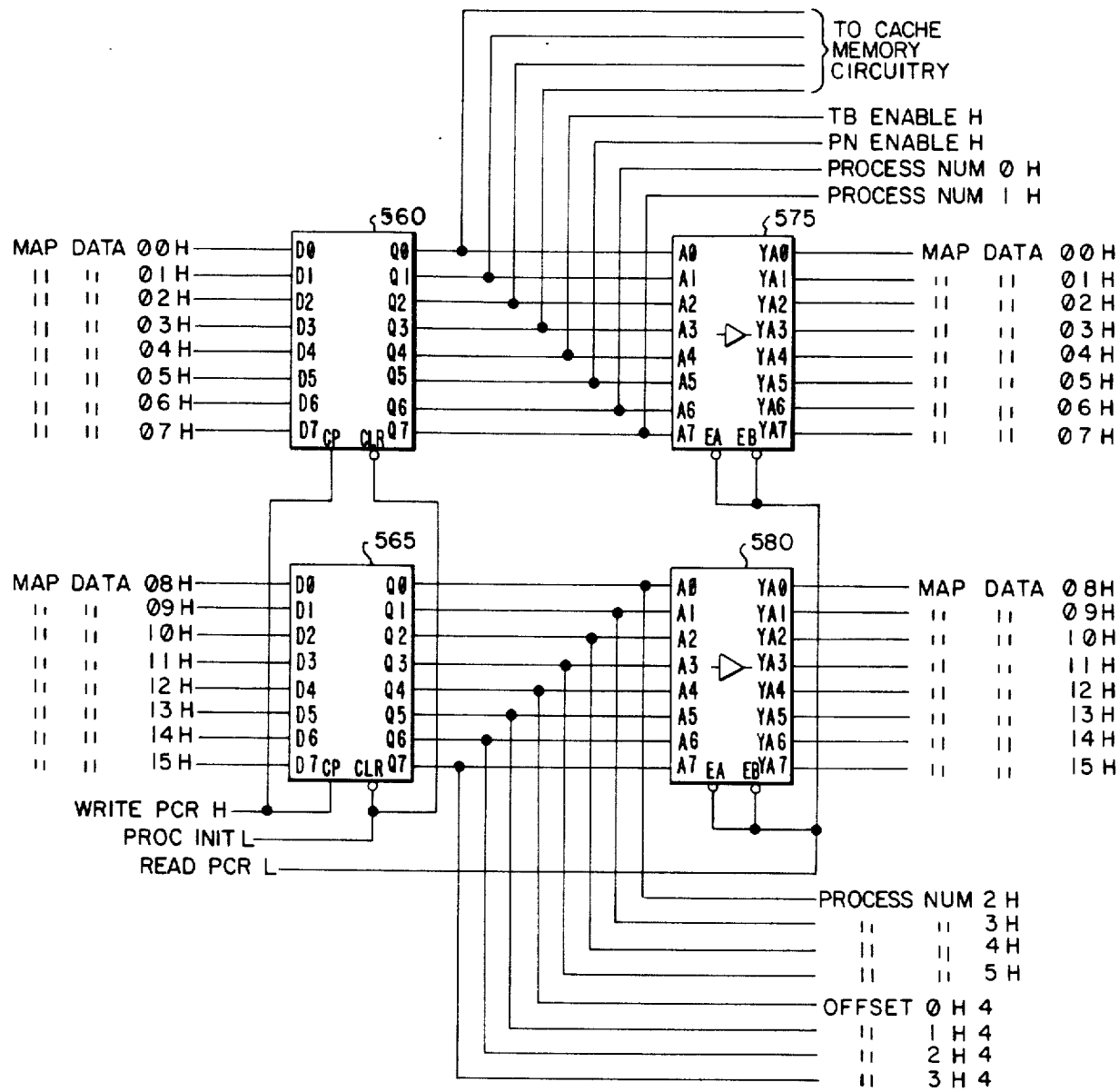
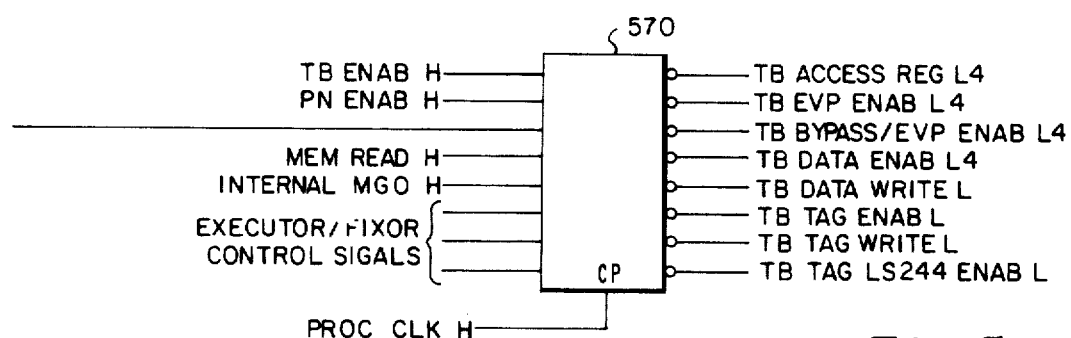
Fig. 5
SHEET 2

COMPUTER MEMORY CONTROL

FIELD OF THE INVENTION

This invention relates to computer memory controls and in particular to memory controls for virtual memory systems.

BACKGROUND OF THE INVENTION

Theoretically, the number of memory locations which can be accessed by a central processor in a simple computer system is limited by the number of bits in the address word used to access the memory. In such a system it is often possible to ensure a one-to-one correspondence between a particular address bit configuration and a physical memory location and, therefore, the address bit configuration generated by the processor may be applied directly to the memory to gain access to information stored within.

In other systems, however, it is desirable that the processor generate addresses which are different from the physical addresses at which the information is stored in the memory. Some type of translation process is therefore required. Such a translation process may be advantageous in order to provide protection for the operating system programs and user programs or to provide more efficient memory storage for systems operating with certain programs.

Translation becomes even more important in multi-tasking or multi-process systems in which two or more tasks or processes are resident in the system memory at the same time and where one process runs during the time while the other is temporarily suspended. In such a multi-tasking system it is possible for each task to separately access the entire memory space through the same processor address bits and therefore such a system can efficiently utilize a memory which may be many times larger than the theoretical size limit dictated by the processor address word size alone. Since each process necessarily uses common address designations, some type of translation is essential to separate the address spaces of the individual programs.

Memory systems in which an address translation is required are typically called virtual memory systems. The processor generates a "logical" or "virtual" address which is provided to a memory management unit which contains a translator. The output of the translator is the physical address which is, in fact, used to access the memory. Typically, the translator is a table (designated a "page table") which is itself located in memory. Therefore, an ordinary memory access requires, in fact, two accesses to memory in order to produce desired data. The first memory access reads the translator table and the second access reads data from the physical address obtained from the translator table.

In order to obtain reasonable translation efficiency, all virtual memory systems use a high-speed translation buffer to perform the most frequently used address translations. A translation buffer is typically a high-speed hardware store which contains a table (commonly designated the "page table entry store") of selected entries from the translator table. During a memory access, a portion of the virtual address produced by the processor is used to index an entry in the page table entry store. If the entry is valid (designated a "hit"), it contains the corresponding physical address which is available at hardware speeds. If a valid translation is not located in the page table entry store (a "miss") then additional hardware is activated which performs a normal memory access to the translator table stored in memory, obtains and writes the physical address data into the proper page table entry for use at a later time.

In the conventional virtual memory system, each location in the page table entry store can be indexed by several virtual addresses. Therefore, it is necessary to separate page table entry store locations which contain data valid for a particular virtual address from those which contain data meaningless for a the virtual address. This separation is conventionally done by utilizing additional bits commonly known as "tag" bits. The tag bit portion or field of a virtual address word usually consists of several highest-order bits. These bits are stored in a "tag store" associated with the page table entry store at corresponding address locations. When an access is made to the page table entry store, the tag bits located in the tag store are simultaneously indexed and are compared to the tag field of the virtual address. A match or hit indicates that the page table entry is valid.

Such a prior art translation operation works well in general purpose systems. However, in systems primarily designed for multi-processing or multi-tasking, inter-program protection is a primary necessity in order to ensure operational integrity of each process and its associated data. This protection is normally achieved by using different sets of translations for each process. Therefore, even if each process uses common virtual addresses, the translation process will insure that both the process and its data will be located in a unique physical memory space.

To insure integrity in a virtual system which utilizes a translation buffer, the buffer must be cleared or "flushed" (by invalidating all entries) during a context switch to prevent one program from invading the address space of its predecessor. A significant penalty time is therefore incurred because the buffer must first be flushed and then slowly refilled by "misses" as the process runs. For most general purpose systems these penalty times are not critical in the overall operation of the system.

However, in systems designed especially for "real-time" applications, response time is often critical to the success or failure of the operation. In addition, in a real-time system the amount of task swapping is often greatly increased over normal, general purpose operations and therefore the penalty time incurred in flushing the translation buffer and then refilling it contributes significantly to a long response time.

Some memory management units utilize a different type of operation than that described above in order to avoid some of the penalty time normally associated with context switches. In this latter type of memory management system, each processor task is assigned a unique process number or address space number and the translations for all of the running tasks in the system are simultaneously stored in the translation buffer store. The memory of the system is artificially divided into segments of variable length. Each entry in the translation buffer store is a segment "descriptor" which includes the physical address of the segment in memory, the associated virtual address and the address space number of the task using that address together with masks for determining which bits in the virtual address and the address space number are significant (the masking operation determines the effective segment length). In addition, the corresponding virtual address together with a mask indicating which bits are significant in that address are also stored with the physical address information.

In such a system the translation buffer entries are not indexed directly by means of the virtual address. Instead, the virtual address produced by the processor and the virtual address stored in each memory location are masked and compared. In addition, both the processor number or address space number produced by the processor during each task and the stored address space number are masked and compared. If there are matches in both the address space numbers and the virtual addresses, then the corresponding physical address information is masked and used as the physical address.

One advantage of such a prior art system is that the address translations for all tasks are simultaneously stored in the buffer store and a flush and refill of the buffer store is not required during a context switch. However, since the translation buffer store is not indexed directly from the virtual address but the virtual address and address space number are first masked by stored information and then compared to other stored information, each location in the translation buffer store must have two comparators associated with it. Therefore, a large amount of circuitry is required to process address translations. Large translation buffers are often required for real-time systems and this latter translation scheme typically uses a large amount of integrated circuit "real estate" and is subject to hardware faults and other problems.

It is therefore an object of the present invention to provide memory control circuitry suitable for use with virtual memory systems which is optimizied for use with multi-processing or multi-tasking systems.

It is another object of the invention to provide memory control circuitry which avoids the time penalty associated with flushing the translation buffer and refilling it during a context switch.

It is a further object of the invention to provide a memory control circuitry which is suitable for multitasking virtual memory system which does not require large amounts of repetitive circuitry.

It is yet another object of the present invention to provide a mechanism for preventing short programs from continually reusing the same portion of the address translation buffer yet allowing large programs to use the entire translation buffer, if necessary.

SUMMARY OF THE INVENTION

The foregoing problems are solved and the foregoing objects are achieved in one illustrative embodiment of the invention in which a memory control circuit utilizes a translation buffer which is directly indexed by the virtual address produced by the system processor. The translation buffer simultaneously contains a set of translations for each task or program which is in the system memory, but the translations for each task are separated by assigning each task a unique process number which is stored in each buffer entry along with the physical address and tag bit information. During a normal translation operation, the system processor indexes the translation buffer store by means of a virtual address. Circuitry then compares the tag bits and the process number at the indexed entry location to the tag bits of the virtual address and the process number of the currently-running process. A match in both the tag bits and the process number indicates a valid translation entry.

In order to prevent different tasks from continually reusing the same buffer table locations when short tasks are being run, the processor maintains an offset number associated with each process. Prior to indexing into the translation buffer store, the offset number associated with the currently-running process is added to the virtual address to provide a modified virtual address. Different offset numbers for each task insure that each task's lowest order address (the "base" address) is located in a different portion of the buffer store from other tasks. However, since there are no preset size limits on the buffer address space which may be utilized by a program, large programs may have access to the entire buffer, if necessary.

BRIEF DESCRIPTION OF THE DRAWINGS

FIG. 1A is a diagram of the arrangement of information in a translation buffer entry.

DETAILED DESCRIPTION

Figure 1:
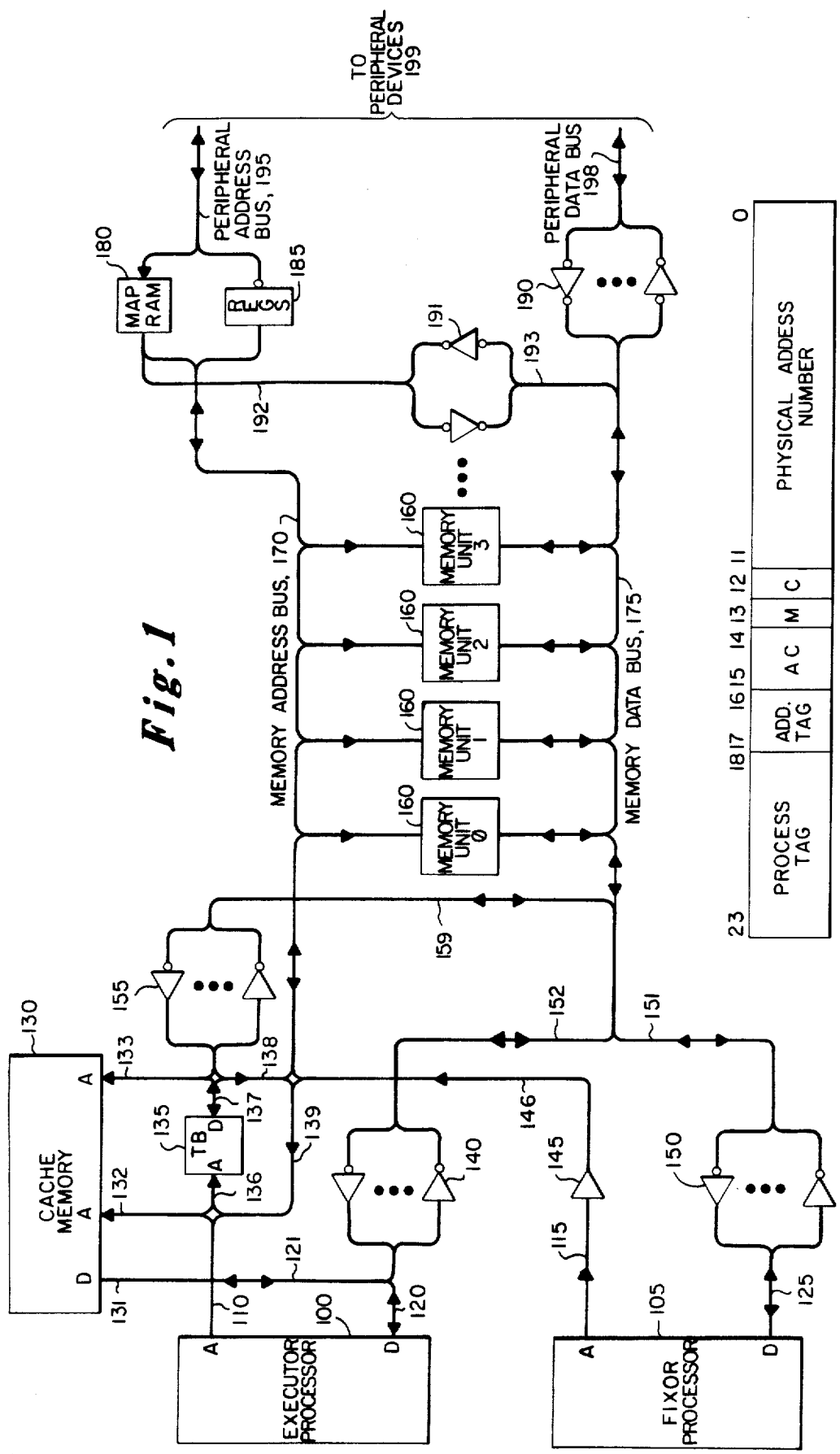
FIG. 1 shows a block schematic diagram of the inventive memory system showing address and data paths.

FIG. 1 shows a general block diagram which illustrates the signal flow on the address and data busses between the major units of an illustrative virtual memory system. The illustrative system includes two processors designated as 100 and 105 which are required by the characteristics of the processor and are not required to operate with the inventive translation buffer circuitry. In particular, processor 100 is called an "executor" processor and performs all of the normal duties and computations associated with the computer system. Executor processor 100 is internally arranged so that when a translation "miss" occurs in the translation buffer, processor 100 temporarily suspends operation or "stalls".

Processor 105 (designated as the "fixor" processor) is provided to assume control of the system during translation misses and other fault situations and "fix" the outstanding translation miss by accessing main memory, obtaining the required translation from the translation table and updating the translation buffer store. The executor processor is then restarted and resumes normal processing.

Each of processors 100 and 105 is provided with two busses for communicating address and data information to the rest of the system. Each bus is schematically illustrated by a heavy line and actually consists of a plurality of separate leads or lines. The heavy arrows show the direction of movement of information on each of the busses.

In particular, processor 100 is provided with port 110 which is an outgoing port for providing address information to memory units 160 and to peripheral units connected to peripheral bus 199. In a typical processor such an address port would consist of 23 terminals, each carrying one "bit" of address information in parallel configuration. Processor 100 is also provided with bi-directional data port 120 which both provides information to, and receives information from, the memories and peripheral units. A typical data port would consist of 16 data bit lines. Processor 105 is similarly provided with an address port 115 and a bi-directional data port 125.

Information going to and coming from processors 100 and 105 via data ports 120 and 125, respectively, passes through bi-directional bus transceivers 140 and 150. Although transceivers 140 and 150 are schematically shown as two driver units, as is well understood, a separate driver circuit is, in fact, used for each line in the bus. Devices 140 and 150 are well-known circuits which are capable of driving the bus impedance and provide isolation for the computer input and output ports.

From transceivers 140 and 150, information is provided by busses 152 and 151 to memory data bus 175. Information on data bus 175 may be provided in parallel to conventional memory data units 160 of which four units (memory units 0-3) are shown. Additional memory units may be added to the system as necessary but are not shown for clarity. In addition, the information on the memory data bus 175 may be provided, via an additional transceiver unit 190 and peripheral data bus 198, to other peripheral devices (not shown).

Memory data bus 175 is also connected, via bus 159 and transceiver 155, to data input/output 137 of the translation buffer 135. As will be hereinafter described, this latter connection allows fixor processor 105 to load translation data obtained from the translation table located in memory units 160 into the translation buffer during a "fixing" operation in a translation miss situation.

During the normal operation of the memory system a translation must be made between the virtual address produced by executor processor 100 and the physical addresses utilized by memory devices 160. In the process of this translation operation an attempt is first made to obtain the translated address informatiom from translation buffer 135. More specifically, executor processor 100 produces on its output 110 a virtual address to access a desired memory location in memory units 160. Although in FIG. 1 all of the address bus lines of processor output port 110 are shown connected to translation buffer 135, commonly, only some of the virtual address lines are provided to the input port 136 of translation buffer 135. The remaining lines bypass the translation buffer and are used unmapped as part of the translated address.

After receiving virtual address information from processor 100, circuitry in buffer 135 operates to determine if valid translation data is present in buffer 135 which corresponds to that virtual address. Assuming that such translation information of the particular virtual address desired is present in translation buffer 135, a translated physical address is generated at translation buffer input/output 137 and provided, via bus 138, to the memory address bus 170 and to the address port 133 of cache memory 130.

The illustrative memory system normally attempts to fetch the desired information from cache memory 130 before attempting an access to memory units 160. Cache memory 130 is a well-known device which stores a selected portions of the main memory in order to decrease memory access time. In particular, executor processor 100 may provide address information to cache memory 130 either directly, via its address port 132, or after translation by buffer 135 via port 133. If the desired information is located in the cache memory (designated as a cache "hit") the data is provided from cache memory data port 131 to the processor over bus 121. If the data is not present in the cache memory, well-known circuitry updates cache memory 130 from main memory units 160. The operating details of the cache memory are not important to an understanding of the present invention and, accordingly, memory 130 will not be discussed in further detail herein.

If the desired data is not located in the cache memory 130, address information is gated onto memory address bus 170 and provided to memory units 160 to access selected memory locations in a well-known manner.

The information on bus 170 may also be provided to peripheral devices over the peripheral address bus 199. In particular, outgoing information on memory address bus 170 is provided to holding registers 185 and gated onto the peripheral address bus 195 during an input/output operation. However, since most peripheral devices generate sequential address signals, a mechanism must be provided to translate the sequential addresses produced by the peripheral devices into physical address information utilized by memory units 160. This function is provided by map RAM 180. Incoming address information on peripheral address bus 195 is provided, as will be hereinafter described in additional detail, as an input to map RAM 180 which contains the translation information necessary to translate the incoming addresses into the physical addresses used to access memory units 160. The translation information in map RAM 180 must be loaded by executor processor 100 from the memory data bus 175 via bus 193, drivers 191 and bus 192 prior to accessing peripheral devices.

Assuming now that the required translation is not found in translation buffer 135, a translation "miss" occurs and executor processor 100 stalls. Control ciruitry (not shown) activates fixor processor 105, which, in turn, controls translation buffer 135 to pass through the untranslated virtual address at its input port 135 which address appears at buffer output port 137 and is provided, via drivers 155, busses 154 and 151, and drivers 150 to the data port 125 of processor 105.

Processor 105 uses the virtual address produced by processor 100 as a base address to access the translator table located in memory units 160. In particular, processor 105 provides an internal offset number which is added to the base virtual address and the modified address is provided, via address port 115, driver 145 and bus 146, to memory address bus 170. This address indexes the translation table stored in the main memory to obtain the required translation.

Physical address data from the translator tables in memory units 160 appears on memory data bus 175 and is provided, via bus 151 and driver 150, to data port 125 of fixor processor 105. Processor 105 thereupon initiates a write process to update the translation buffer by providing the physical address information, via driver 150, busses 151 and 154 and buffer unit 155 to the data input/output 137 of translation buffer 135 and commanding buffer 135 to write the information into its internal memory. This write operation also updates the validation information in the buffer store to insure a match during subsequent accesses. Processor 100 is then restarted and allowed to continue the translation process which caused the translation miss.

FIG. 1A shows the arrangement of stored information in each location of translation buffer 135. The information is divided into a plurality of information "fields" of predetermined length. In particular, the lowest twelve bits (bits 0–11) comprise the page frame number or physical address field which, upon a successful translation, is used as the high-order 12 bits of the complete 23-bit address. The next four bits (bits 12–15 designated as C, M, AC0 and AC1 bits) comprise a status field which controls access to the translation buffer locations. Bit 12 (C) is a cache memory control bit which indicates to processor 100 whether the memory access should involve a cache memory access. Bit 13 (M) indicates that the associated buffer entry has been modified since its creation. Bits 14, 15 (AC0, AC1) are access control bits whch contain coded information which are written by processor 105 with coded information that informs processor 100 whether the page information is execute only, read only or read/write (an attempted access to page information in a mode which is not in accordance with the stored code causes a fault situation and stalls processor 100). The next 2 bits (bits 16, 17, designated as the address tag field) are used to validate the physical address information during a translation operation. The last 6 bits (bits 18–23, designated as the process tag field) are the unique process number which, according to the invention, is associated with the process which is using the stored address.

Figure 2:
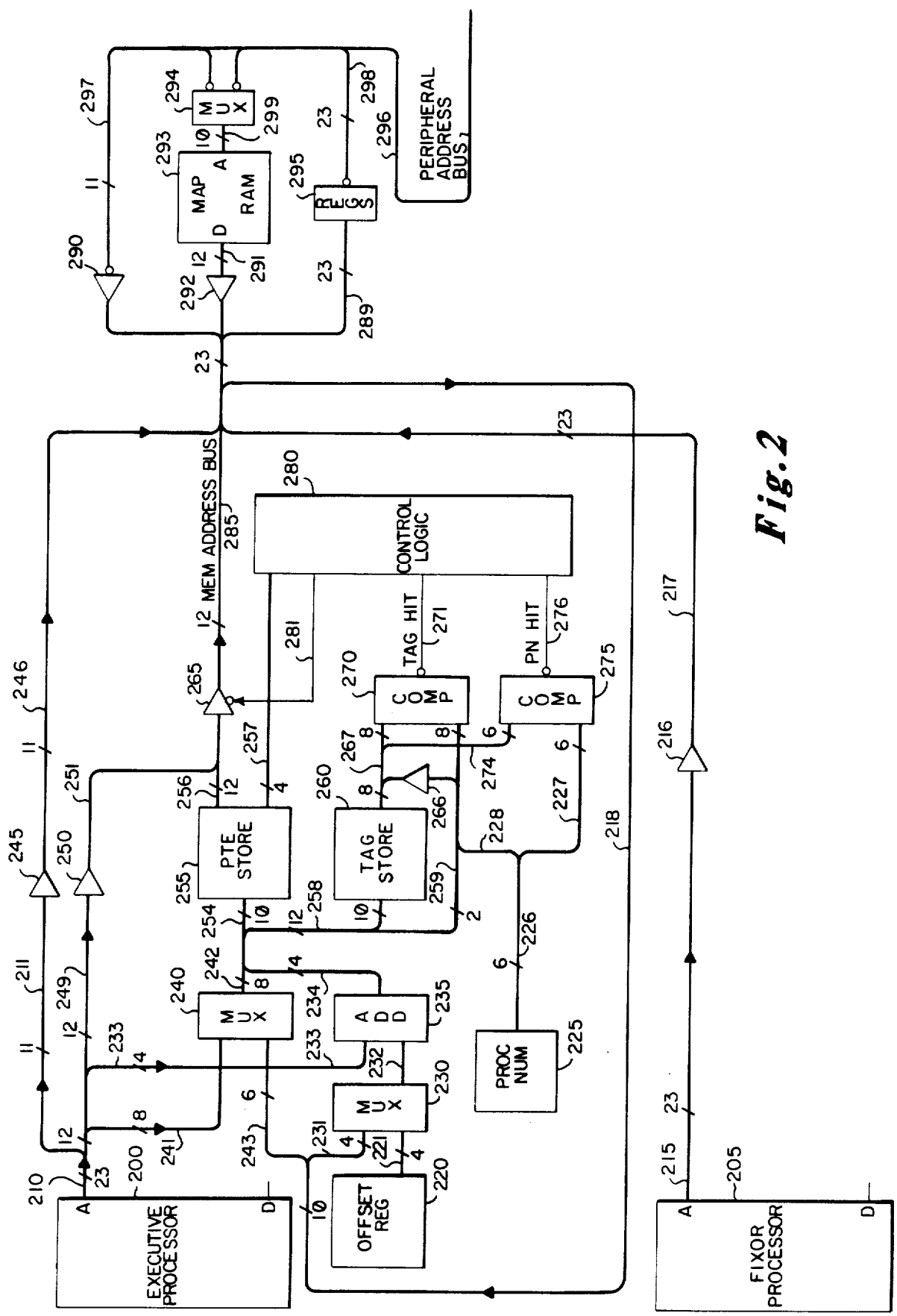
FIG. 2 is a more detailed block schematic diagram of the address paths and the structure of the translation buffer of the present invention.

FIG. 2 shows a more detailed block diagram of the address paths in the illustrative system. The details of the cache memory 130 in FIG. 1 have been eliminated for clarity. As previously mentioned, both executor processor 200 and fixor processor 205 produce 23-bit address words on ports 210 and 215, respectively. Of the 23-bits in the address word, the 11 low-order address bits (bits 1–11) are provided directly, via bus 211, driver 245 and bus 246, to memory address bus 285 without translation. The higher-order address bits (bits 12–23) are provided to the translation buffer circuitry for translation. Therefore, the memory is arranged in pages-the high-order bits determine the page number and the low order bits determine the position on each page.

If the virtual address is to be translated, the address information is provided to multiplexers 240, 230 and addition unit 235 for further processing. Of the 12 high-order bits of the virtual address produced by executor processor 200, 8 bits (including bits 12–17 and bits 22, 23) are provided to the upper input of multiplexer 240.

Multiplexer 240 is a well-known logic circuit which, under control of the control logic 280 selects either its upper or lower input and connects the signals thereon to its output. During a normal translation, the 8 bits of address information provided to the upper input of multiplexer 240 appear on its output 242.

In accordance with the present invention, the illustrative circuitry provides additional inputs to multiplexers 240 and 235 to enable the translation buffer to distinguish separate sets of translations stored therein for different processes running in the computer system. In particular, during a normal translating operation, processor 200 loads two registers with numbers that are associated uniquely with the process which is currently running. Process number register 225 is loaded with a "process" number the identifies the particular process running in executor processor 200. In addition, offset register 220 is loaded with an offset number which is used to physically space the translation buffer store entries for each process throughout the translation buffer space. Proper control of the offset numbers can advantageously prevent several sets of translations from overwriting each other following context switches.

The 4 bits of the virtual address which are not provided to multiplexer 240 (consisting of bits 18–21) are provided to the upper input of addition unit 235. Unit 235 is a well-known circuit device which adds, on a bit-by-bit basis, the offset number in offset register 120 to bits 18–21 of the virtual address.

Specifically, the offset number in register 220 is provided, via ouput 221, to the lower input of multiplexer 230. Under control of the control logic 280, multiplexer 230 applies the offset number via its output 232 to the lower input of adder 235. The modified address is provided over bus 234 and combined with the eight bits produced at the output 242 of mulitplexer 240 to provide a 12-bit address which is used to address page table entry store 255 and the tag store 260. Of the 12 bits, 10 bits (bits 12–21) are used to access stores 255 and 260. The remaining two bits (the tag bits) are provided, via bus 259, to comparator 270 and used to validate the page table data from the output of store 255.

In response to the 10-bit address appearing at its input, page table entry store 255 produces a 12-bit physical adddress on its output 256 and a 4-bit status word on its output 257. The 12-bit physical address becomes the high-order bits of the physical address used to access the memory units if the data can be properly validated. The 4-bit status word produced by store 255 informs control logic 280 of the access status of the indexed location in store 255.

The 10-bit address is also provided to tag store 260 to index a location corresponding to the page table entry produced by store 255. The output of tag store 260 is an 8-bit word of which two bits consist of conventional tag bits and the remaining 6 bits consist of the process number of the process utilizing the entry stored at the indexed location.

The output of tag store 260 is provided, via bus 267, to the upper input of comparator 270. As previously described, the lower input of comparator 270 receives the two tag bits of the virtual address from multiplexer 240 over bus 259. In addition, the process number (6-bits) in process number register 225 is received at the lower input of comparator 270 via busses 226 and 228. Comparator 270 is a well-known logic device which produces a "low" output if the signals at its two inputs are equal which occurs if both the tag bits and the process number bits match.

Assuming that the indexed location in tag store 260 has valid data, a "low" signal will appear on tag hit line 271. In response to these this "low" signal, control circuit 280 places a "low" signal on its output lead 281 which enables buffer 265. The page table entry information comprising the 12-bit physical address at output 256 of page table entry store 255 is then gated onto memory address bus 285. The 12 translated bits and 11 low-order bits which bypassed the translation unit on bus 246 provide the complete 23-bit address.

The address on bus 285 address is provided directly to the memory units if a memory access is to be performed. If a peripheral unit is being accessed, the address bits are provided, via bus 289, to bus transceiver unit 295. Under control of the processor the address bits are then gated over bus 298 to the peripheral 296 and from there to the peripheral units.

An additional comparator, 275, is also provided in the translation buffer to efficiently handle certain unusual situations. For example, in some circumstances it is desirable to change an offset number assigned to a process or assign a process number from one process to another. In these situations, the original process entries must be invalidated to prevent incorrect operation. Rather than invalidating the entire translation buffer and incurring the time delay required in flushing the buffer and refilling it, comparator 275 allows only those entries associated with the original process top be invalidated. In particular, comparator 275 receives the process tag portion of the output of the tag store 260 via bus 274 at its upper input. This number can be compared to the number in the process number register 225, which is provided to comparator 275 via busses 226 and 227. Comparator 275 will indicate a process number match (by a "low" signal on lead 276) regardless of whether there is a tag bit match. Therefore, fixor processor 205 can selectively flush the buffer store by setting process number register 225 to a desired number and invalidating those entries which produce a match as indicated by comparator 275.

Fixor processor 205 may directly access page table entry store 255 in order to read the contents of selected store locations. In particular, processor 205 may place an address on its output 215 which is applied, via driver 216 and bus 217, to memory address bus 285. The low-order 10 bits of memory address bus 285 are provided, via bus 218, to the multiplexers 240 and 230. Specifically, bits 1-6 are provided to multiplexer 240 and bits 7-10 are provided to multiplexer 230. Under supervision of the control logic 280, multiplexers 230 and 240 may be controlled to pass the address bits to their output. Thus, 6 low-order address bits appear on output 242 of multiplexer 240. Bits 7-10 appear on output 232 of multiplexer 230 and are applied to adder 235. Adder 235 may also be operated by control logic 280 to pass the address bits directly to its output 234 (without an addition operation), and thus 10 address bits generated by processor 205 appear at the input 254 of page table store 255 and, via bus 258, at the input of the tag store 260.

Fixor processor 205 may also write information into page table entry store 255 at a location determined by a virtual address generated by the executor processor 200. A write operation of this type occurs when executor processor 200 has stalled because of a translation buffer miss and fixor processor 205 must update the translation buffer. In particular, when processor 200 stalls in the process of indexing table store 255, the virtual address generated by processor 200 and applied to store 255 (as previously described) remains. Fixor processor 205 then is able to write data into the indexed store location over a connection from the memory data bus (shown in FIG. 1).

During an update operation on a location specified by the virtual address generated by stalled executor processor 200, tag store 260 is also updated by fixor processor 205 by a similar write operation. In particular, a process number appearing in process number register 225 and the address tag field of the virtual address generated by executor processor 200 appearing on bus 259 are applied, via driver 266, to the data input of tag store 260 and written in the location indexed by the virtual address and offset register values specified by executor processor 200.

During certain operations, such as a diagnostic operation, it is necessary for the executor processor 200 to directly address the memory without translation. In this case the 11 low-order bits are provided to memory address bus 285, via bus 211, driver 245 and bus 246 as previously described. The 12 high-order bits, however, instead of being translated by the translation buffer are provided, via bus 249, driver 250 and bus 251, to the input of bus driver 265. When enabled by control logic 280, bus driver 265 provides the high-order 12 bits to the memory address bus 285.

Also shown in more detail in FIG. 2 is the input/output map arrangement which allows sequential address information produced by input/output peripheral units to be translated for use with the virtual-mapped memory devices. In particular, input/output devices connected to peripheral address bus 296 generate a 23-bit address equivalent to the address information generated by processors 200 and 205. Since many peripheral devices generate only sequential addresses and the system memory unit may have sequential information stored in various non-sequential locations, the map circuitry performs a translation similar to that performed for the processor by the translation buffer.

Similar to the translation buffer, the eleven low-order bits (bits 1-11) are unmodified and pass directly, via bus 297 and driver 290, onto memory address bus 285. Address bits 21-12 of the addresses put out by peripheral devices are used to index into a translation map located in map RAM 293. In particular, address bits 21-12 are provided to one input of multiplexer 294. The other input of multiplexer 294 is connected to bits 1-10 of the peripheral address bus. Multiplexer 294 allows map RAM 293 to be accessed directly from the peripheral bus for writing or reading, in particular, as previously described, map RAM 293 must be loaded with the appropriate translation information from processor 200 before a peripheral device attempts to access memory. Under control of processor 200, multiplexer 294 selects one set of inputs and applies the signals thereon to the address port of map RAM 293. Map RAM 293 is a 1024×12 bit RAM which responds to the address signals by producing a 12-bit physical address at its output 291, which address is applied, via bus driver 292, to memory address bus 285. These 12 bits, together with the other 11 bits from the output of bus driver 290 provide the translated address for accessing the memory devices.

Information passing from the memory address bus 285 to peripheral address bus 296 is untranslated but passes directly via bus 289, registers 295 and bus 298.

Figure 3:
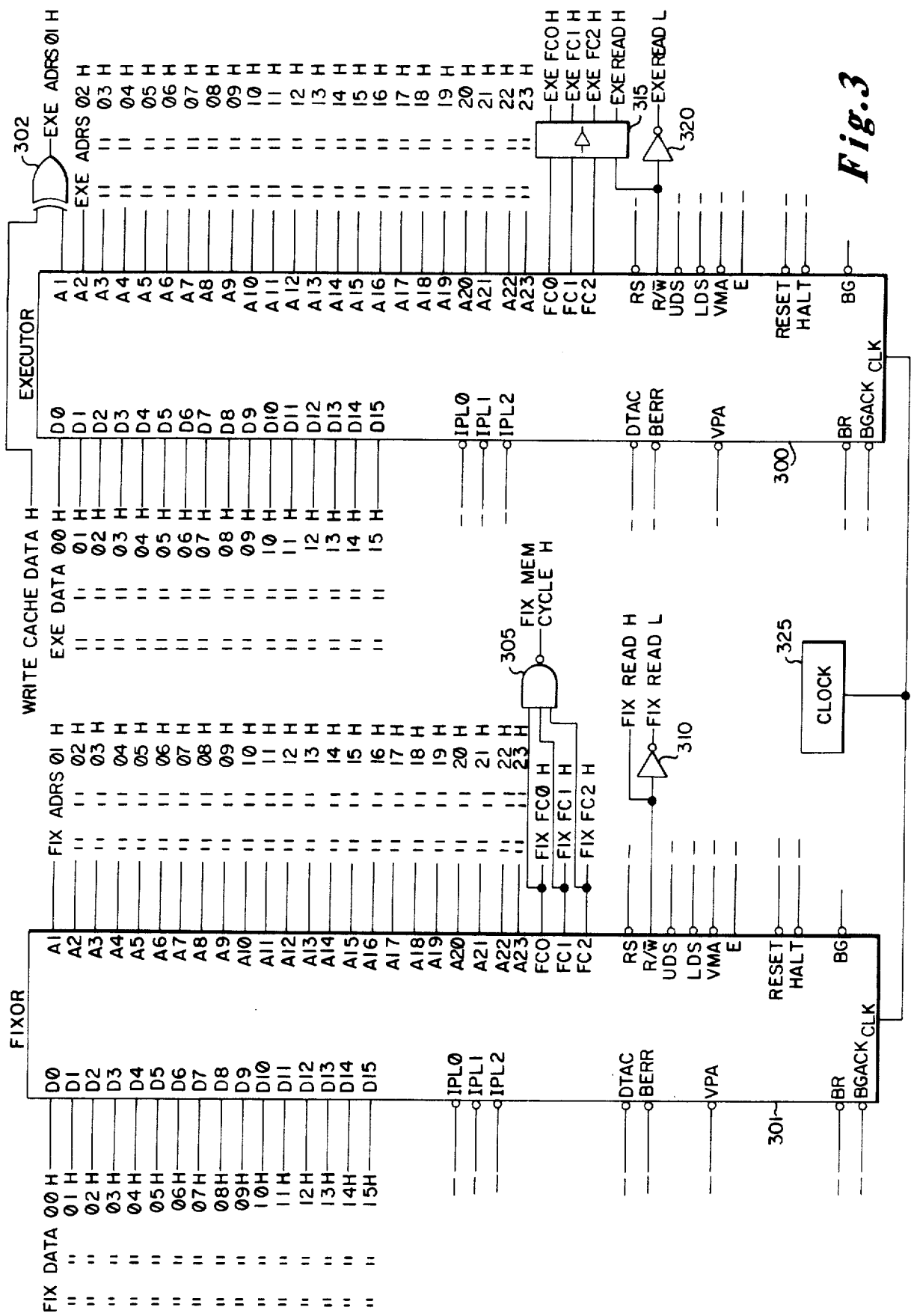
FIG. 3 is an electrical schematic of the processor input/output terminal connections.

FIGS. 3 through 6 show detailed circuitry used to in the illustrative embodiment implement the inventive translation buffer. This circuitry comprises only one embodiment of the invention and other embodiments will be apparent to those skilled in the art. In FIGS. 3 and 6 common nomenclature is used to simplify the description. In particular, each lead is labelled by the signal which appears on that lead. The label consists of signal name followed by a "L" or "H". The "L" indicates that the signal is active or asserted when it is in its "low" state. The "H" indicates that the signal is active or assertive when it is in its "high" state. Signal leads which cross figure boundaries are indicated by numbers preceeding or following label names. A number preceeding a label name indicates that the signal on the associated lead was generated by circuitry shown on that figure number. Similarly, a number following a label name indicates that the signal on that lead is provided to circuitry shown on a corresponding figure number.

FIG. 3 shows the signals produced by the fixor and executor processors. A processor suitable for use with the illustrative system is the model MC68000 microprocessor manufactured by Motorola Semiconductor Products, Inc., 3501 Ed Bluestein Boulevard, Austin, Tex. 78721. The MC68000 microprocessor is a sixteen bit processor which has a twenty-three bit address word. The operation and construction of such a processor are well-known and described in detail in product information sheets on the MC68000 processor published by Motorola Semiconductor Products, Inc.

Executor processor 300 produces a 23-bit address signal on its pins A1-A23. With the exception of the signal produced on terminal A1, these signals are provided to the remaining circuitry on leads EXE ADRS 02 H-EXE ADRS 23 H. The address signal appearing on processor output A1 is provided to the lower input of exclusive-OR gate 302 where it is combined with a signal (WRITE CACHE DATA H) that controls the cache memory to produce the EXE ADRS 01 H address signal.

Executor processor 300 also generates and receives data on its data inputs D0-D15 over leads EXE DATA 00 H-EXE DATA 15 H. Processor 300 controls external circuitry by means of functions codes on its function code outputs FC0-FC2. After buffering by line driver 315, these signals are provided to the remaining circuitry via leads EXE FC0 H-EXE FC2 H.

Processor 300 indicates whether the operation it is performing is a "read" or "write" operation by means of the signal on its R/W terminal which signal is also buffered by buffer 315 and provided on the EXE READ H lead to external circuitry. An additional version of the read/write signal which is active when "low" is provided by inverter 320 on the EXE READ L lead.

Processor 300 also produces and receives various other control signals on its remaining terminals which signals are not important for an understanding of the present invention and which are explained in the above-mentioned data sheets published by the manufacturer.

Fixor processor 301 is nearly identically configured to executor processor 300. Processor 301 provides address signals over leads FIX ADRS 01 H-FIX ADRS 23 H. Processor 301 also receives and transmits data over leads FIX DATA 00 H-FIX DATA 15 H. The function code signals present at terminals FC0-FC2 of fixor processor 301 are provided to the circuitry over leads FIX FC0 H-FIX FC2 H, respectively, and are also provided to the inputs of AND gate 305 to produce a signal on lead FIX MEM CYCLE H which is "high" whenever a "low" signal appears on any of the three function code leads. This latter signal indicates that the processor is operating in a memory read or write cycle. Fixor processor 301 also generates a read signal which is active in either the "high" or "low" states at the input and output of invertor 310 on leads FIX READ H and FIX READ L, respectively.

Both processors 300 and 301 are driven by a clock signal generated by system clock 325 and applied to the CLK inputs of the processors in are well-known manner.

Figure 4:
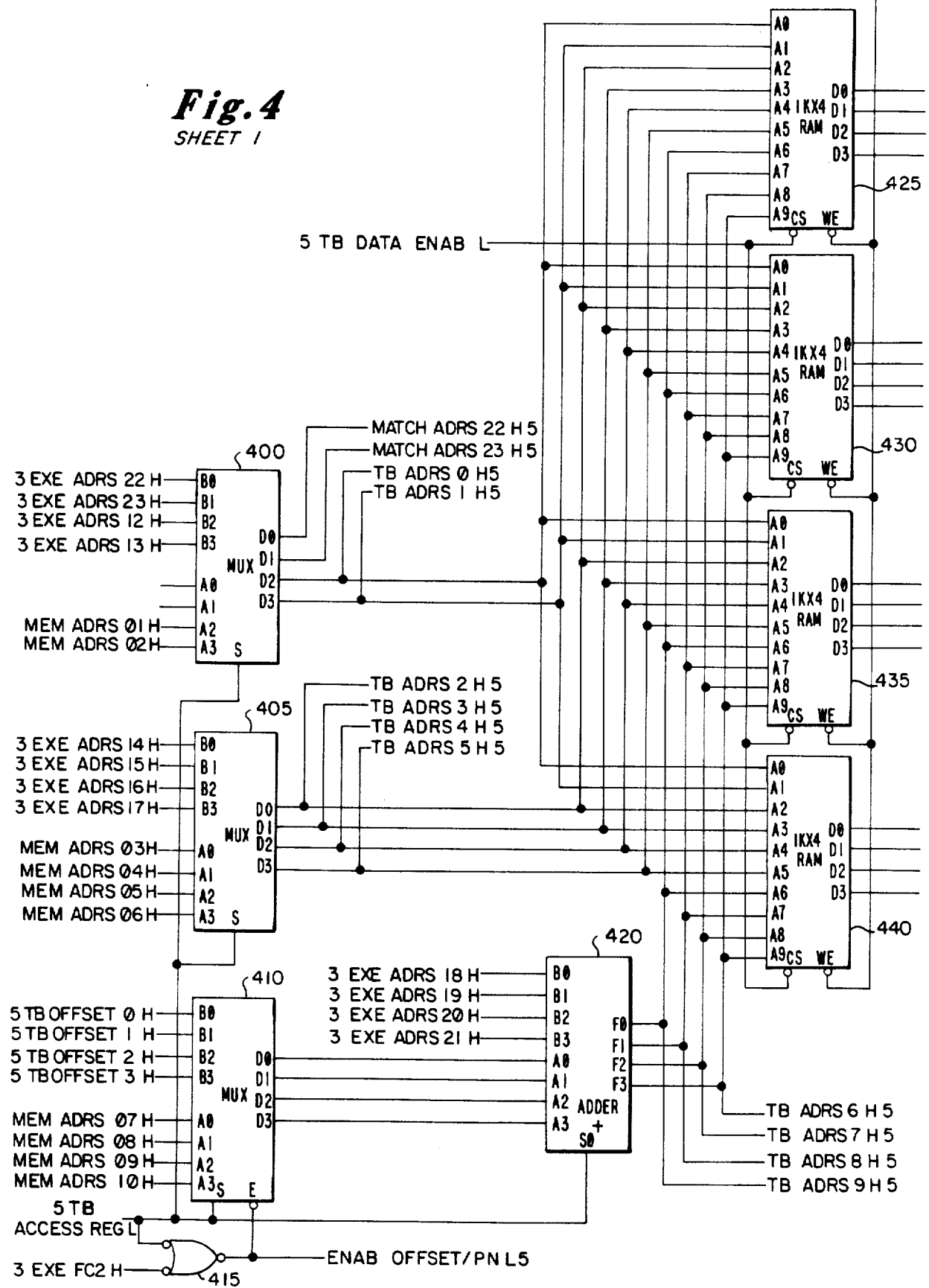
FIG. 4 is detailed schematic of the page table entry store and associated circuitry.
Figure 4:
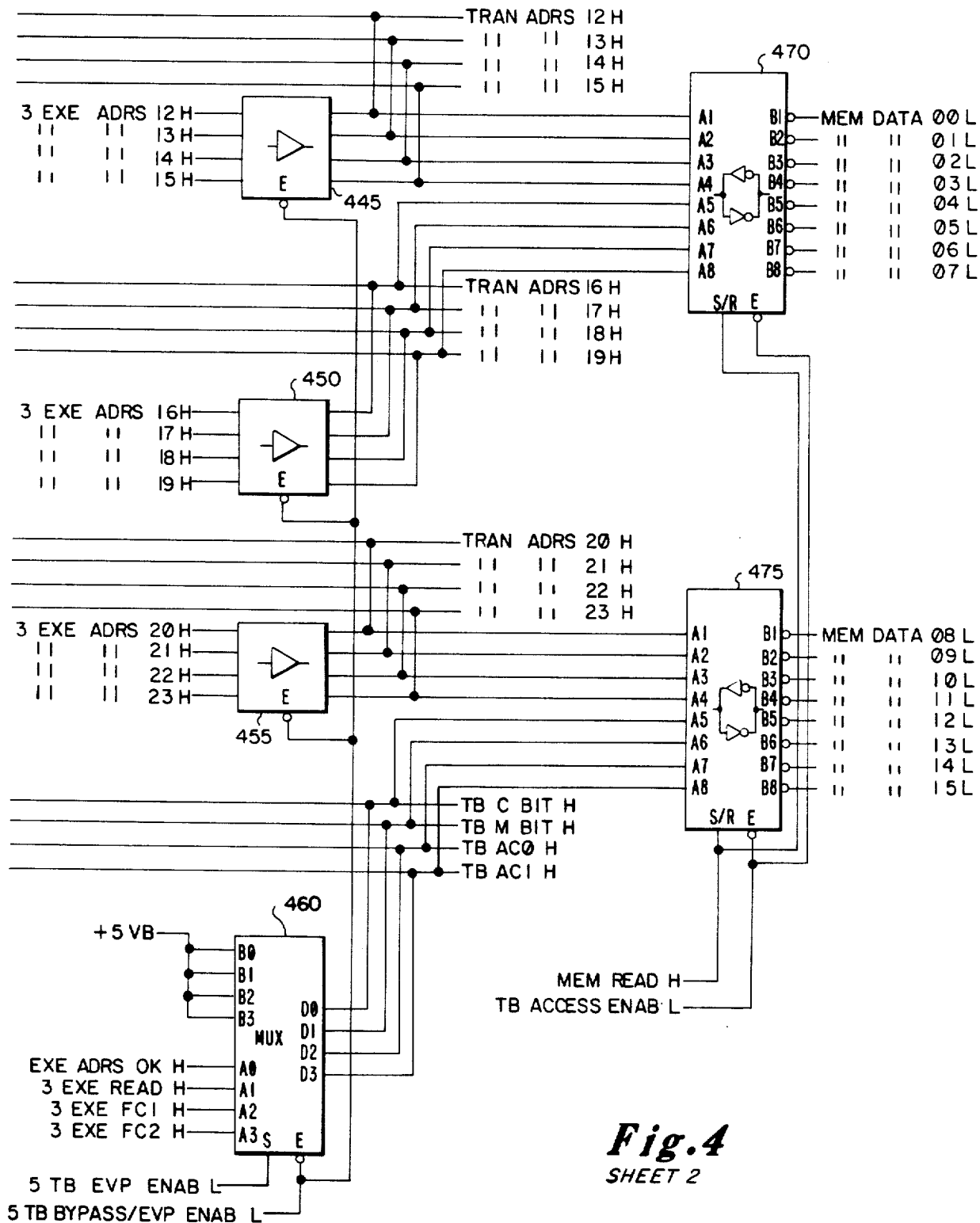

FIG. 4 shows the detailed circuitry associated with the translation buffer page table entry store and its associated input and output circuitry. In particular, the page table entry store consists of four 1K×4 RAMs, 425-440. Each of these RAM memories is a well-known random access memory circuit which has 10 address terminals, designated A0-A9. In response to address signals placed on its address leads, each RAM will either produce data from the indexed location on its data terminals, D0-D3, or accept data on these terminals to be written into an indexed memory location depending on the state of the signal provided to the write enable terminal, WE, (a "low" signal at terminal WE indicates a write operation). Each RAM is also enabled by a "low" signal applied its respective chip select port, CS, to either provide data or accept a write operation.

Together, rams 425-440 provide a 12-bits of output data which comprises the page frame number field of the translation buffer memory.

Address signals are provided to RAMs 425-440 by means of multiplexer circuits 400-410 and addition circuit 420. In particular, as previously described, the 12 high-order bits of the virtual address produced by executor processor 300 are provided for translation to the page table entry store. Accordingly, executor address bits 17-22 provided to the upper four inputs of multiplexers 400 and 405 via lead 3 EXE ADRS 22 H-3 EXE ADRS 17 H.

The upper inputs of multiplexer 410 are provided with a 4-bit offset number which, in accordance with the invention, is added to the virtual address produced by executor processor 300 in order to define a unique address space for each process in page table entry store RAMs 425-440.

More specifically, inputs B0-B3 of multiplexer 410 are provided with the four bits of the offset number on leads 5 TB OFFSET 0 H-5 TB OFFSET 3 H. The lower inputs A0-A3 of multiplexers 400-410 are provided with 10 address bits from the memory address bus. As previously described, this connection is used to allow fixor processor 301 to specify an address to the page table entry store. Accordingly, memory address signals are provided to multiplexers 400-410 over leads MEM ADRS 01 H-MEM ADRS 10 H.

Multiplexers 400-410 are well-known circuit devices which connect the signals present at either the upper (A0-A3) inputs or lower (B0-B3) inputs to their outputs, D0-D3, depending on the state of the signal presented to the S input. In particular, when a signal is "high", the inputs on the B0-B3 terminals are connected to the outputs D0-D3 and when the signal present at the S input is "low", the signals on the A0-A3 inputs are connected to the D0-D3 outputs. The signal at the S inputs of multiplexers 400-410 is controlled by the signal on the 5 TB ACCESS REG L lead. The signal on this lead is under control of fixor processor 301 and is "high" during a normal translation operation. Accordingly, multiplexers 400-410 connect executor address bits 22-17 and the 4-bit offset number to their respective D0-D3 outputs.

Figure 5:
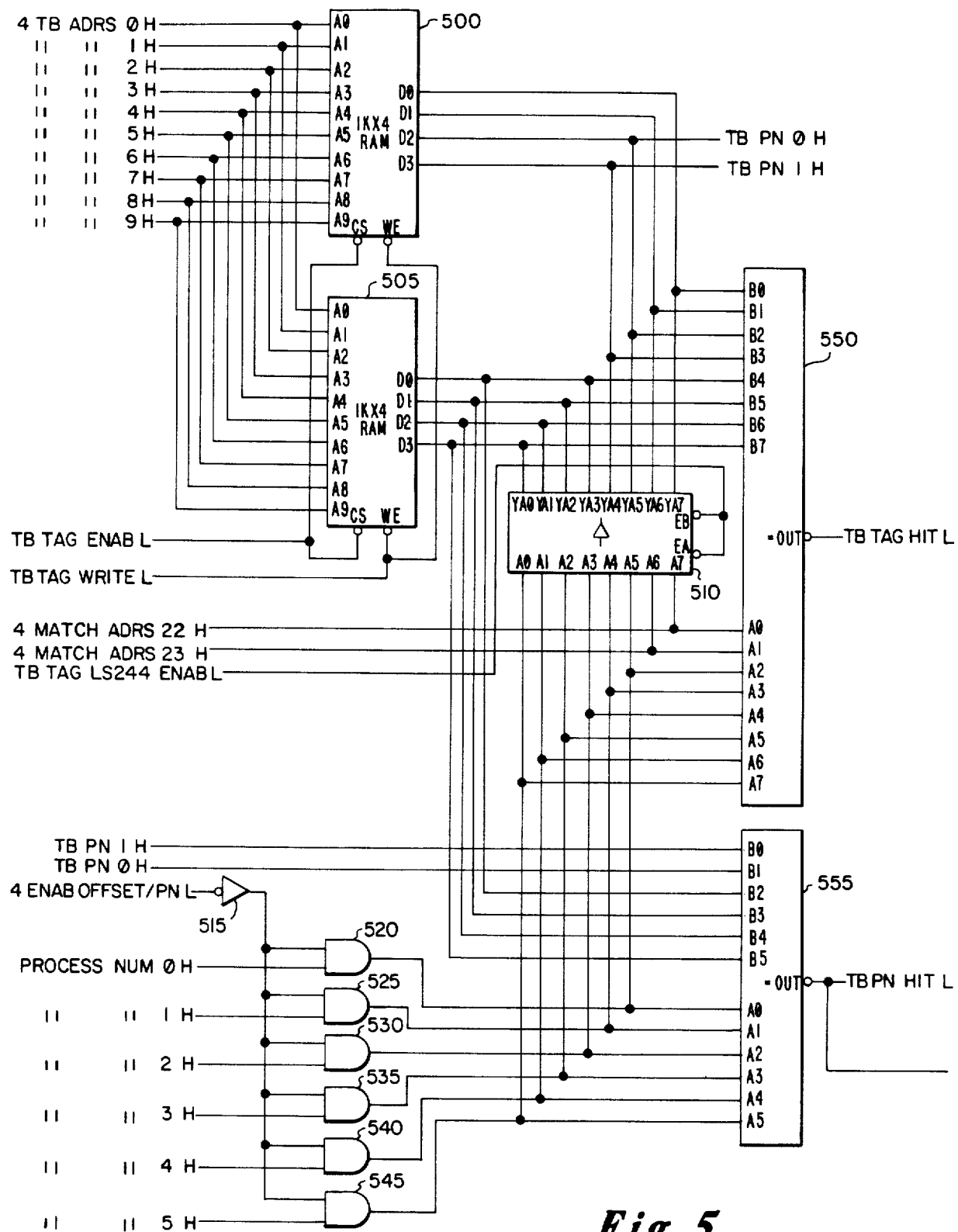
FIG. 5 of the drawing is a detailed schematic of the tag store and associated comparators and control registers.

Executor address bits 22 and 23 (the address tag field) appearing at the D0 and D1 outputs, respectively, of multiplexer 400 are provided, via leads MATCH ADRS 22 H 5 and MATCH ADRS 23 H 5, to the circuitry shown in FIG. 5 which compares them to the stored address tag bits to validate the information in the indexed location in the page table store. The remaining executor address bits are provided to RAMs 425-440 via leads TB ADRS 0 H 5-TB ADRS 5 H 5.

The 4-bit offset number produced at D0-D3 outputs of multiplexer 410 is provided to the lower inputs, A0-A3, of adder 420. The upper inputs of adder 420 are connected to the 4 high-order bits (bits 18–21) of the executor address via leads 3 EXE ADRS 18 H-3 EXE ADRS 21 H. Adder 420 is a well-known circuit which either adds, bit-by-bit, the signals at its "A" and "B" inputs and provides the sum to its outputs, F0–F3, or passes the signal present at its "A" input directly to outputs F0–F3 depending on the state of the signal presented to its S0 input. In the case of a normal translation operation, a "high" signal is provided, via lead 5 TB ACCESS REG L, to adder input S0 and causes the addition of the offset number to the four high-order executor address bits. The sum appears at outputs F0–F3 of adder 420 and is provided to the address inputs of RAMs 425–440 via leads TB ADRS 6 H 5-TB ADRS 9 H 5.

The signal on the 5 TB ACCESS REG L lead is also applied to the upper input of NAND gate 415. The lower input of gate 415 is connected to a function code output of executor processor 300 via lead 3 EXE FC2 H. The output of gate 415 is therefore "low" or active during a translation operation which utilizes the process number and the offset number. Under this condition, a "low" signal appears on lead ENAB OFFSET/PN L 5.

Fixor processor 301, can indirectly control the operation of the page table entry store to perform either a read or write operation by means of a portion of the control circuitry shown in FIG. 5. In particular the store RAMs are controlled by the signals appearing on leads 5 TB DATA WRITE L and 5 TB DATA ENABLE L.

During a normal translation operation, fixor processor 301 controls the signals on these leads so that the stored information in the indexed entry in the page table store appears on outputs D0–D3 of RAMs 425–435. The outputs D0–D3 of RAM 440 contain the associated status bits C, M, AC0, and AC1. As previously explained, the status data controls access by fixor processor 301 to the 1024 locations in the translation buffer. The information on the outputs D0–D3 of multiplexer 440 is provided to fixor processor 301 via leads TB C BIT H, TB M BIT H, TB AC0 H, and TB AC1 H.

The physical address number produced at the outputs of RAMs 425–435 is provided to bus driver circuitry (not shown) via leads TRAN ADRS 12 H-TRAN ADRS 23 H. The bus driver circuitry is controlled, as previously described, to gate the translated address bits 12–23 onto the memory address bus where the bits are combined with the untranslated low-order 11 bits to form the complete translated address.

Also shown in FIG. 4 is the register and control circuitry which allows the translation buffer to be bypassed under certain circumstances. In particular, bits 12–23 of the executor address are provided, via leads 3 EXE ADRS 12 H-3 EXE ADRS 23 H to the inputs of buffer/drivers 445–455. These buffers are enabled by a "low" signal on the 5 TB BYPASS/EVP ENAB L lead when the translation buffer circuitry is to be bypassed. Under these circumstances, the outputs of the buffer drivers 445–455 are provided directly to the memory address bus via leads TRAN ADRS 12 H-TRAN ADRS 23 H.

The outputs of RAMs 425–440 are also connected to the input/output ports of bi-directional drivers 470 and 475. The other input/output ports of drivers 470 and 475 are connected to the memory data bus by leads MEM DATA 00 L-MEM DATA 15 L. This connection allows fixor processor 301 to either read the information present in an indexed location in the page table entry store or write an appropriate location under control of signals on the 5 TB DATA WRITE L lead.

In particular, bi-directional drivers 470 and 475 are controlled by signals on the MEM READ H and TB ACCESS ENAB L leads which are connected to the S/R and E inputs respectively of drivers 470 and 475. The MEM READ H and TB ACCESS ENAB L leads are indirectly controlled by fixor processor 301 by means of circuitry shown in FIG. 5. In particular fixor processor 301 may read the outputs of the page table number RAMs by placing a "high" signal on the MEM READ H lead and a "low" signal on the TB ACCESS ENAB L lead whch cause data present at the outputs of RAMs 425–440 to be placed on the memory data leads. Fixor processor 301 may also write data into the page table number store by placing a "low" signal on the MEM READ H lead and a "low" signal on the TB ACCESS ENAB L lead causing data on the memory data leads to be presented to the outputs of RAMs 425–440.

Also shown in FIG. 4 is multiplexer 460 which is used by fixor processor 301 during an operation called an "executor virtual page operation". This operation allows fixor processor 301 to read the virtual page number produced by executor processor 300 and the attempted access type as specified by the executor processor function control bits, FC1 and FC2. This information can be used by fixor processor 301 to determine the state of the system during a fault or other problem.

To perform an "executor virtual page operation", fixor processor 301 operates control circuitry shown in FIG. 5 (to be described later) to place "low" signals on the 5 TB EVP ENAB L and the 5 TB BYPASS/EVP ENAB L lead. The signal on the 5 TB BYPASS/EVP ENAB L lead enables multiplexer 460 and buffer drivers 445–455. As previously explained, buffers 445–455, when enabled, place executor address bits 12–23 on the translated address leads TRAN ADRS 12 H-TRAN ADRS 23 H. These signals are provided, via bi-directional drivers 470 and 475, to the memory data leads which can be read by fixor processor 301. In addition, the "low" signal on lead 5 TB EVP ENAB L causes multiplexer 460 to apply signals indicating the state of executor processor 300 to the leads which normally carry the status bits stores in RAM 440. In particular, multiplexer 460 receives at its lower inputs, A0–A3, a signal indicating whether the executor is producing a valid address (EXE ADRS OK H), a signal indicating whether the operation is a read or write operation (3 EXE READ H) and signals indicating whether the attempted access is to a user program, user data or a supervisor program or data (3 EXE FC1 H and 3 EXE FC2 H). These signals are also provided via bi-directional driver 475 to the memory data bus where they can be read by fixor processor 301.

FIG. 5 of the drawing shows the RAM units used to store the tag field and process number field of each translation buffer entry and the comparators used to detect tag and process number "hits". Also shown in FIG. 5 is a portion of the process control circuitry including the process number and offset number registers and a portion of the circuitry which fixor processor 301 utilizes to control and sequence the translation buffer circuitry.

The tag/process number store is formed from RAMs 500 and 505 which are 1K × 4 random access memory units. The address terminals, A0–A9, of these RAMs is provided with the translation buffer addresses generated by the multiplexer circuitry shown in FIG. 4 via leads 4 TB ADRS 0 H-4 TB ADRS 9 H. Thus, the information appearing on the data outputs of RAMs 500 and 505 will be the address tag field information and the process tag field information from the indexed location. Since RAMs 500 and 505 receive the same address signals as RAMs 425–440 the address and process tags will correspond to the indexed page table number.

RAMs 500 and 505 are enabled by a "low" signal applied to their chip select (CS) inputs via lead TB TAG ENAB L. The signal on this lead is controlled by logic circuitry 570 which is, in turn, controlled by fixor processor 301. During a normal translation fixor processor 301 places a "low" signal on this lead enabling RAMs 500 and 505.

The data appearing at output terminals D0–D1 of ram 500 are the tag bits which are used to validate the page table number entry derived from the page table number entry store. These bits are applied to inputs B0 and B1 of 8-bit comparator 550. Outputs D2, D3 and of RAM 500 and outputs D0–D3 of RAM 503 comprise the 6-bit process number. The process number is applied to inputs B2–B7 of comparator 550 and input B0–B5 of comparator 555. The lower inputs A0–A7 of comparator 550 receive the tag bit signals produced by the multiplexer circuitry in FIG. 4 via lead 4 MATCH ADRS 22 H and 4 MATCH ADRS 23 H. The 6-bit process number is provided at inputs A2–A7 of comparators 550 and 555 from the process number register, as will be hereinafter described. Similarly, 6 lower inputs of comparator 555 receive the process number from output of the process register.

In accordance with the invention, comparators 550 and 555 compare the tag bit and process number information to determine whether the indexed location in the page table number store contains valid data for the particular process which is running. When the signals at its "A" and "B" inputs match, comparator 550 produces a "low" signal on lead TB TAG HIT L. This signal indicates that both the tag numbers and the process numbers have matched and signals the control circuitry to gate the page number information onto the memory address bus.

Comparator 555 produces a "low" output on lead TB PN HIT L when its "A" and "B" inputs are equal indicating that the process number stored in the tag/process number store matches the process number of the running process. THis output is used, as previously described, by fixor processor 301 to selectively flush the translation buffer.

The process number which is provided to the comparators 550 and 555 is generated by AND gates 520–545. These gates receive process number signals via leads PROCESS NUM 0 H–PROCESS NUM 5 H from the process number register comprised of registers 560 and 565. Gates 520–545 are enabled by a "high" signal produced by the output of invertor 515 which in turn receives a "low" signal via lead 5 ENAB OFFSET/PN L when the offset and process number circuits are enabled, as previously described.

Process number registers 560 and 565 can be loaded from the same data bus which processor 300 uses to load the peripheral map RAM that translates addresses for peripheral devices. In particular, map data leads, MAP DATA 00 H–MAP DATA 15 H are provided to the B0–B7 inputs of registers 560 and 565. These registers can be loaded with the process number and offset information under control of the executor processor when it asserts the WRITE PCR H lead which is applied to the CP of registers 560 and 565. Registers 560 and 565 are, in turn, cleared by a "low" signal applied to a processor initialization lead, PROC INIT L, which signal is applied to the clear inputs (CLR) of registers 560 and 565.

Outputs Q0–Q3 of register 560 contain information that is used in the operation of the cache memory circuitry and is not important for the understanding of this invention. Output Q4 of register 560 is a status information bit which enables the translation buffer circuitry. Output Q5 is another status information bit which enables the process number matching circuitry. Outputs Q6 and Q7 of register 560 and outputs Q0–Q3 of register 565 are the 6-bit process number which is used for validation of the page table information. Outputs Q4–Q7 of register 565 are the 4-bit offset register number which is added to the high-order bits of the executor virtual address to determine the address space in the trnaslation buffer.

The outputs of registers 560 and 565 may be either read or written through bi-directional drivers 575 and 580, respectively, by either executor processor 300 or fixor processor 301 over the memory data bus by way of the peripheral map data bus. In particular, signals on the memory data bus may be gated by driver circuitry (not shown) onto the map data leads MAP DATA 00 H–MAP DATA 15 H. The signals on these leads are, in turn applied by drivers 575 and 580 to registers 560 and 565.

The operation of the translation buffer circuitry is coordinated and controlled by both the fixor processor 301 and the executor processor 300 by means of control logic 570. Circuit 570 is a programmable logic circuit which receives varous status inputs, logically combines the inputs and generates control and coordination signals.

Specifically, circuit 570 receives as inputs: the translation buffer and process number status signals over leads TB ENAB H and PN ENAB H from the process number register 560. These signals indicate whether the translation buffer and process number circuits are to be enabled. Circuit 570 also receives the output of comparator 555 (via lead TB PN HIT L) indicating a process number match for selective translation buffer flushing. A signal is provided on lead MEM READ H which is controlled by both processors to indicate a read operation. Signals are also received from executor processor 300 and fixor processor 301 (whichever is active) indicating the type of operation to be performed. Finally, clock, timing and coordination signals (via leads INTERNAL MGO H and PROC CLK H) are provided to synchronize the generation of the control signals.

In response to its input signals, circuit 570 generates output control signals to operate the translation buffer circuitry as described. Specifically, fixor processor controls the generation of a control signal on lead TB ACCESS REG L 4 to condition the translation buffer for direct addressing from the memory address bus instead of the executor virtual address. Signals controlled by fixor processor 301 on leads TB EVP ENAB L 4 and TB BYPASS/EVP ENAB L 4 allow the fixor processor to perform an "executor virtual page operation" as previously described or bypass the translation buffer operation and provide untranslated addresses to the memory address bus. Both executor processor 300 and fixor processor 301 similarly control the TB DATA ENAB L 4 lead to control the reading of the the page table data store. Lead TB DATA WRITE L is controlled by fixor processor 301 to write data into the page table number store. A similar function is performed by signals on the TB TAG ENAB L lead which enables reading of the tag store. Signals generated by fixor processor 301 on the TB TAG WRITE L lead and the TB TAG LS244 ENB L lead control writing of the tag store.

Specifically, the signals on the latter leads are used to enable the write terminal (WE) on the tag store RAMs 500 and 505. A signal on the TB TAG LS244 ENAB L lead enables driver/buffer 510 and allows the address tag information on leads 4 MATCH ADRS 22 H and 4 MATCH ADRS 23 H to be written into tag store RAM 500. Similarly, the process number outputs of gates 520-545 can be written, via enabled driver 510 into tag stores 500 and 505.

Although only one embodiment of the invention is disclosed herein, other embodiments within the spirit and scope of the invention will be apparent to those of ordinary skill in the art.

What is claimed is:

1. In a multi-tasking computer system having a memory with data information and a plurality of programs stored therein at least one memory location identified by a first address, said computer system further having a central processor including means for selecting one of said plurality of programs to run in said processor, means for computing a unique offset number for said selected program, means for generating a second address to identify information stored in said one memory location, and a translation store having at least one storage location and being responsive to a first preselected portion of said second address for producing information stored in said storage location, the improvement comprising, means for receiving from said central processor and for storing an offset number computed for said selected program, means for logically combining a temporarily-stored offset number with said first preselected portion of said address to produce logical combination signals, and means for applying said logical combination signals to said translation store instead of said first preselected portion of said second address to perform a storage access.

2. In a multi-tasking computer system, the improvement according to claim 1 wherein said applying means further comprises means responsive to said logical combination signals for storing said second address at the translation store location specified by said logical combination signals.

3. In a multi-tasking computer system, the improvement according to claim 2 wherein said logical combination means comprises means for logically combining, bit-by-bit, said temporarily-stored offset number with said first preselected portion of said second address.

4. In a multi-tasking computer system, the improvement according to claim 3 wherein said logical combination operation is a bit-by-bit addition.

5. Memory control apparatus for use with a multi-tasking computer system having a memory with data information and a plurality of programs stored therein, at least one memory location identified by a physical address, said computer system further having a central processor including means for selecting one of said plurality of programs to run in said processor, means for computing a unique offset number for said selected program and means for generating a virtual address to identify information stored in said one memory location, said control apparatus comprising, a translation store having a plurality of storage locations and being responsive to address signals for retrieving information stored in one of said storage locations, means for storing in one of said storage locations said physical address, means for receiving from said processor and for temporarily storing the offset number computed for said selected program, means for logically combining a temporarily-stored offset number with a preselected portion of said virtual address to produce logical combination signals, means for applying said logical combination signals to said translation store as address signals to perform a storage access to retrieve information stored in said one storage location, including said physical address, and means responsive to said retrieved physical address for accessing said memory.

6. Memory control apparatus according to claim 5 wherein said physical address storing means further comprises means responsive to said logical combination signals for storing said physical address at the translation store location specified by said logical combination signals.

7. Memory control apparatus according to claim 5 wherein said logical combination means comprises means for logically combining, bit-by-bit, said temporarily-stored offset number with said preselected portion of said virtual address.

8. A memory control system according to claim 7 wherein said logical combination operation is a bit-by-bit addition.

9. Memory control apparatus according to claim 5 wherein said processor further comprises means for computing a unique process number for said selected program, and said memory control apparatus further comprises, means for receiving from said central processor said computed process number and for temporarily storing said computed process number, means operable upon the storage of said physical address in said one location for storing in said one storage location said temporarily-stored process number, and means responsive to said retrieved information for comparing the retrieved process number with the temporarily-stored process number.

10. Memory control apparatus for use with a multi-tasking computer system having a memory with data information and a plurality of programs stored therein, a plurality of memory locations identified by a plurality of physical addresses, said computer system further having a central processor including means for selecting one of said plurality of programs to run in said processor, means for computing a unique offset number for said selected program, means for computing a unique process number for said selected program, means for generating a virtual address to identify information stored in one of said memory locations, said control apparatus comprising, a translation store having a plurality of storage locations and being responsive to address signals for retrieving information stored in one of said storage locations, an offset number register, means for receiving said computed offset number from said processor and for temporarily storing the received offset number in said offset number register, a process number register, means for receiving said computed process number from said processor and for temporarily storing the received process number in said process number register, a bit-by-bit adder for logically adding the offset number stored in said offset number register to a preselected portion of said virtual address to produce logical addition signals, means for applying said logical addition signals to said translation store as address signals, means controlled by said central processor for storing the physical address identifying said one memory location and the process number stored in said process number register in said translation store at the translation store location specified by said address signals.

11. Memory control apparatus according to claim 10 further comprising means responsive to address address signals for performing a storage access to retrieve information stored in said translation store at a location specified by address signals, said information including a physical address and a process number, a comparator for comparing said retrieved process number with the process number stored in said process number register, and means responsive to said retrieved physical address for accessing said memory at the memory location specified by said retrieved physical address when said retrieved process number equals said process number stored in said process number register.

* * * * *